(12) United States Patent
Smith

(10) Patent No.: US 9,755,420 B2
(45) Date of Patent: Sep. 5, 2017

(54) ELECTRICALLY INSULATED TETHERS FOR TRANSMISSION LINE ARRESTERS

(71) Applicant: Timothy Stephen Smith, Fuquay Varina, NC (US)

(72) Inventor: Timothy Stephen Smith, Fuquay Varina, NC (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 227 days.

(21) Appl. No.: 14/728,112

(22) Filed: Jun. 2, 2015

(65) Prior Publication Data

US 2015/0349515 A1     Dec. 3, 2015

Related U.S. Application Data

(60) Provisional application No. 62/006,531, filed on Jun. 2, 2014.

(51) Int. Cl.
| | | |
|---|---|---|
| *H02H 3/22* | (2006.01) | |
| *H01C 7/12* | (2006.01) | |
| *H01H 33/00* | (2006.01) | |

(52) U.S. Cl.
CPC ............ *H02H 3/22* (2013.01); *H01C 7/126* (2013.01); *H01H 33/00* (2013.01)

(58) Field of Classification Search
CPC .......... H02H 3/22; H01C 7/126; H01H 33/00
See application file for complete search history.

(56) References Cited

U.S. PATENT DOCUMENTS

| 2,871,313 | A | * | 1/1959 | Chabala | ............... | H01H 85/044 |
|---|---|---|---|---|---|---|
| | | | | | | 337/218 |
| 5,237,482 | A | * | 8/1993 | Osterhout | .............. | H01C 7/126 |
| | | | | | | 361/117 |
| 5,400,207 | A | * | 3/1995 | Krause | ..................... | H01T 1/14 |
| | | | | | | 361/117 |

(Continued)

FOREIGN PATENT DOCUMENTS

EP     0548333 B1     9/1996

OTHER PUBLICATIONS

International Search Report and Written Opinion for Corresponding PCT Application No. PCT/US2015/033668, dated Oct. 8, 2015, 6 pages.

*Primary Examiner* — Scott Bauer
(74) *Attorney, Agent, or Firm* — King & Spalding LLP

(57) ABSTRACT

An electrical transmission system is described herein. The electrical transmission system can include at least one first phase high-voltage conductor. The electrical transmission system can also include an arrester coupled to the at least one first phase high-voltage conductor, where the arrester includes an arrester body and an isolator, where the arrester body includes a top end and a bottom end, where the top end of the arrester is coupled to the at least one first phase high-voltage conductor, and where the bottom end of the arrester body is coupled to the isolator. The electrical transmission system can further include a ground conductor coupled to a bottom end of the isolator of the arrester. The electrical transmission system can also include a tether coupled to the ground conductor, where the tether comprises a distal end, where the distal end of the tether is coupled to the arrester above the isolator.

20 Claims, 4 Drawing Sheets

(56) References Cited

U.S. PATENT DOCUMENTS

| | | | | |
|---|---|---|---|---|
| 5,991,141 A | * | 11/1999 | Mikli | H01C 7/12 |
| | | | | 361/117 |
| 6,356,428 B1 | * | 3/2002 | Akervall | H02B 5/02 |
| | | | | 361/117 |
| 7,522,812 B2 | * | 4/2009 | Zitting | H04B 3/542 |
| | | | | 174/50 |
| 8,638,537 B2 | | 1/2014 | Kester et al. | |

* cited by examiner

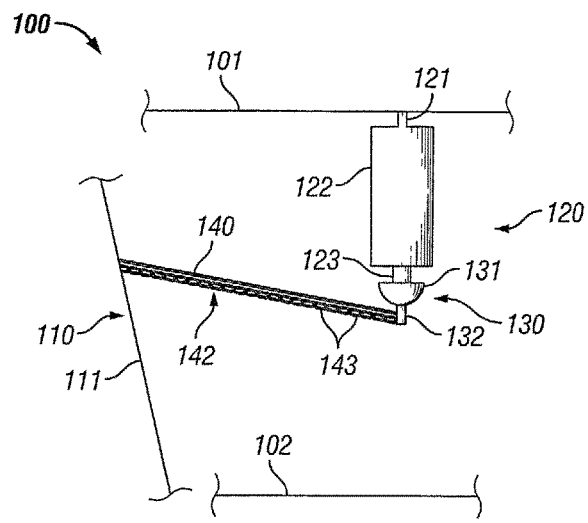
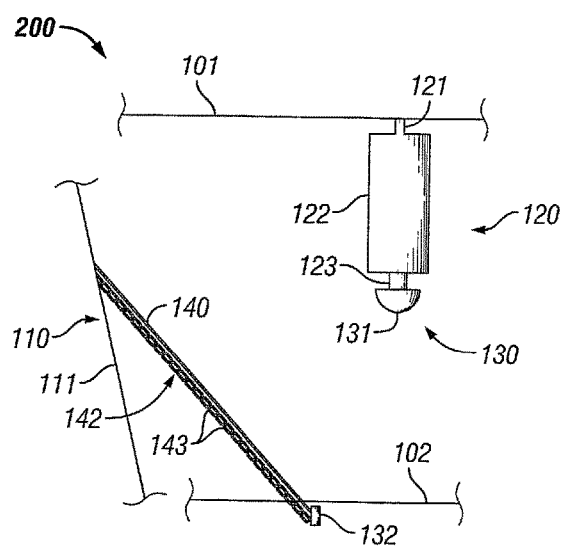
FIG. 1
(Prior Art)
FIG. 2
(Prior Art)

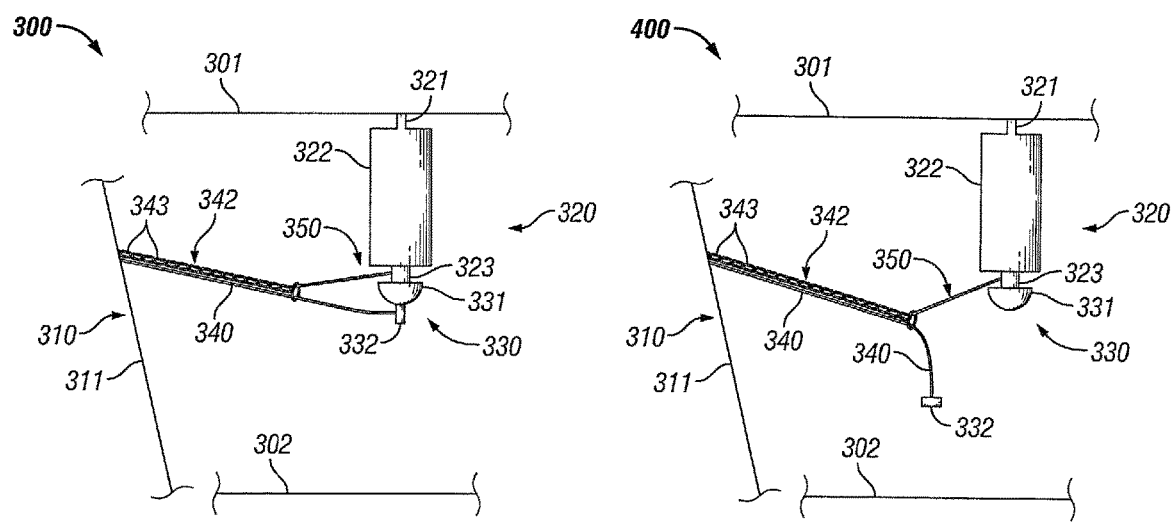

ELECTRICALLY INSULATED TETHERS FOR TRANSMISSION LINE ARRESTERS

CROSS REFERENCE TO RELATED APPLICATIONS

This application claims priority under 35 U.S.C. §119 to U.S. Provisional Patent Application Ser. No. 62/006,531, titled "Electrically Insulated Tethers For Transmission Line Arresters" and filed on Jun. 2, 2014, the entire contents of which are hereby incorporated herein by reference.

TECHNICAL FIELD

Embodiments described herein relate generally to electric power transmission equipment, and more particularly to systems, methods, and devices for electrically insulated tethers for transmission line arresters.

BACKGROUND

An arrester (sometimes called a lightning arrester or a surge arrester) is a device used on electrical power systems and telecommunications systems to protect the insulation and conductors of the system from the damaging effects of lightning and other fault currents. A typical arrester has a high-voltage terminal and a secondary terminal. When a power surge (fault current) travels along the power line to the arrester, the current from the surge is diverted through the arrestor, in most cases to earth (ground, also called an electrical ground or an earth ground). If protection from the arrester fails or is absent, a power surge on the electrical system can introduce thousands of kilovolts that may damage transmission lines and/or cause severe damage to transformers and other electrical or electronic devices.

SUMMARY

In general, in one aspect, the disclosure relates to an electrical transmission system. The electrical transmission system can include at least one first phase high-voltage conductor. The electrical transmission system can also include an arrester coupled to the at least one first phase high-voltage conductor, where the arrester includes an arrester body and an isolator, where the arrester body has a top end and a bottom end, where the top end of the arrester is coupled to the at least one first phase high-voltage conductor, and where the bottom end of the arrester body is coupled to the isolator. The electrical transmission system can further include a ground conductor coupled to a bottom end of the isolator of the arrester. The electrical transmission system can also include a tether coupled to the ground conductor, wherein the tether has a distal end, where the distal end of the tether is coupled to the arrester above the isolator. At least a portion of the tether can be electrically non-conductive.

In another aspect, the disclosure can generally relate to a tether for a ground source coupled to an arrester. The tether can include a coupling portion having a first coupling feature and a second coupling feature, where the first coupling feature is configured to couple to the arrester between an arrester body and an isolator of the arrester. The tether can also include an insulating portion having a first end and a second end, where the first end is coupled to the second coupling feature of the coupling portion, where the second end is coupled to the ground source. At least a portion of the insulating portion can be electrically non-conductive.

These and other aspects, objects, features, and embodiments will be apparent from the following description and the appended claims.

BRIEF DESCRIPTION OF THE DRAWINGS

The drawings illustrate only example embodiments of electrically insulated tethers for transmission line arresters and are therefore not to be considered limiting of its scope, as electrically insulated tethers for transmission line arresters may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIG. 1 shows a portion of a transmission system that includes a transmission line arrester in a normally-operating state according to embodiments currently known in the art.

FIG. 2 shows the portion of the transmission system of FIG. 1 that includes the transmission line arrester in a fault state according to embodiments currently known in the art.

FIG. 3 shows a portion of a transmission system that includes a transmission line arrester in a normally-operating state in accordance with certain example embodiments.

FIG. 4 shows the portion of the transmission system of FIG. 3 that includes the transmission line arrester in a fault state in accordance with certain example embodiments.

DETAILED DESCRIPTION OF EXAMPLE EMBODIMENTS

Figure 5:
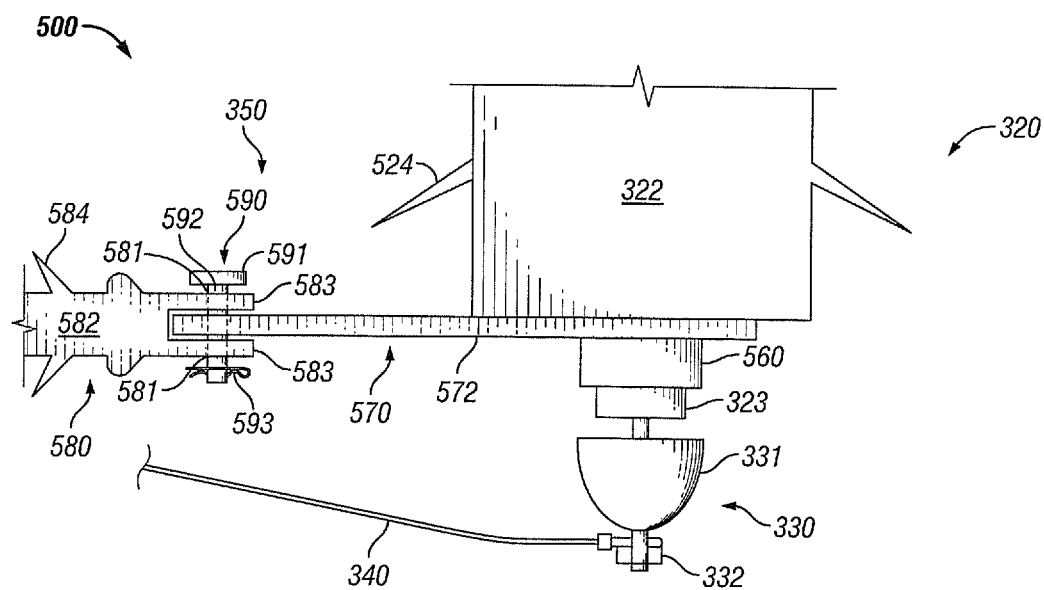
FIG. 5 shows a detailed view of the additional tether of FIG. 3 coupled to the arrester in accordance with certain example embodiments.

The example embodiments discussed herein are directed to systems, apparatuses, and methods of electrically insulated tethers for transmission line arresters. While example embodiments are described herein as being directed to transmission line arresters, example embodiments can also be used in other systems using arresters, including but not limited to electric distribution systems. As described herein, a user can be any person that interacts with example electrically insulated tethers for transmission line arresters. Examples of a user may include, but are not limited to, a consumer, an electrician, an engineer, a lineman, a consultant, a contractor, an operator, and a manufacturer's representative.

In one or more example embodiments, an arrester or similar electrical protection device is subject to meeting certain standards and/or requirements. For example, the International Electrotechnical Commission (IEC) sets standards, such as IEC 60099-4 Ed 2.2 (2009) that applies to metal-oxide surge arresters without gaps for alternating current (AC) systems, with which an arrester must comply to be used in field applications.

The electrically insulated tethers for transmission line arresters (or components thereof) described herein can be physically placed in outdoor environments. In addition, or in the alternative, example electrically insulated tethers for transmission line arresters (or components thereof) can be subject to extreme heat, extreme cold, moisture, humidity, chemical exposure (related to potential combustion for chemical corrosion), high winds, dust, and other conditions that can cause wear on the electrically insulated tethers or portions thereof.

In certain example embodiments, the electrically insulated tethers for transmission line arresters, including any components and/or portions thereof, are made of one or more materials that are designed to maintain a long-term useful life and to perform when required without mechanical failure. Examples of such materials can include, but are not limited to, aluminum, stainless steel, fiberglass, glass, plastic, ceramic, and rubber.

Any components (e.g., tether) of example electrically insulated tethers for transmission line arresters, or portions thereof, described herein can be made from a single piece (as from a mold, injection mold, die cast, or extrusion process). In addition, or in the alternative, a component (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting, or other similar terms. Such terms are merely meant to distinguish various elements and/or features within a component or device and are not meant to limit the capability or function of that particular element and/or feature. For example, a feature described as a "coupling feature" can couple, secure, fasten, abut, and/or perform other functions aside from, or in addition to, merely coupling.

A coupling feature (including a complementary coupling feature) as described herein can allow one or more components and/or portions of electrically insulated tethers for transmission line arresters (e.g., a coupling portion of a tether) to become mechanically and/or electrically coupled, directly or indirectly, to another portion (e.g., an arrester) of the electrically insulated tethers for transmission line arresters. A coupling feature can include, but is not limited to, a clamp, a portion of a hinge, an aperture, a recessed area, a protrusion, a slot, a spring clip, a tab, a detent, and mating threads. One portion of an example electrically insulated tether for transmission line arresters can be coupled to another portion of the electrically insulated tether for transmission line arresters by the direct use of one or more coupling features. In addition, or in the alternative, a portion of an example modular light fixture can be coupled to another portion of the modular light fixture using one or more independent devices that interact with one or more coupling features disposed on a component of the modular light fixture. Examples of such devices can include, but are not limited to, a pin, a hinge, a fastening device (e.g., a bolt, a screw, a rivet), and a spring.

One coupling feature described herein can be the same as, or different than, one or more other coupling features described herein. A complementary coupling feature as described herein can be a coupling feature that mechanically couples, directly or indirectly, with another coupling feature. For any figure shown and described herein, one or more of the components may be omitted, added, repeated, and/or substituted. Accordingly, embodiments shown in a particular figure should not be considered limited to the specific arrangements of components shown in such figure.

Example embodiments of electrically insulated tethers for transmission line arresters will be described more fully hereinafter with reference to the accompanying drawings, in which example electrically insulated tethers for transmission line arresters are shown. Electrically insulated tethers for transmission line arresters may, however, be embodied in many different forms and should not be construed as limited to the example embodiments set forth herein. Rather, these example embodiments are provided so that this disclosure will be thorough and complete, and will fully convey the scope of electrically insulated tethers for transmission line arresters to those of ordinary skill in the art. Like, but not necessarily the same, elements (also sometimes called components) in the various figures are denoted by like reference numerals for consistency.

Terms such as "top", "bottom", "distal", "proximal", "end", "thickness", "length", "width", "diameter", "first", and "second" are used merely to distinguish one component (or part of a component or state of a component) from another. Such terms are not meant to denote a preference or a particular orientation, and are not meant to limit embodiments of electrically insulated tethers for transmission line arresters. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a portion of a transmission system 100 that includes a transmission line arrester 120 in a normally-operating state according to embodiments currently known in the art. The portion of the transmission system 100 of FIG. 1 can include a ground source 110, at least one first phase high-voltage conductor 101, at least one second phase high-voltage conductor 102, an arrester 120, a ground conductor 140, and a tether 142.

The ground source 110 can be any device that is electrically coupled to an earth ground. An example of a ground source 110, as shown in FIG. 1, can be a transmission tower having multiple pieces 111 made of metal or some other electrically conductive material. Other examples of a ground source 110 can include, but are not limited to, a ground conductor (separate from the ground conductor 140), an electrically conductive pole, and a ground grid.

The first phase high-voltage conductor 101 can be one or more conductors that carry a common phase of power. For example, the first phase high-voltage conductor 101 can carry one phase of AC power. As another example, the first phase high-voltage conductor 101 can carry one leg (e.g., positive leg, negative leg) of direct current (DC) power. The power flowing through the first phase high-voltage conductor 101 can have a voltage level that is sufficient to use an arrester (e.g., arrester 120) in the manner shown in FIG. 1. Typically, but not always, the voltage carried by the first-phase high-voltage conductor 101 is associated with the transmission (as opposed to distribution) of electric power. Examples of such voltage can include, but are not limited to, 230 kVAC, 345 kVAC, and 600 kVDC.

Similarly, the second phase high-voltage conductor 102 can be one or more conductors that carry a common phase of power that is part of the power that flows through the first phase high-voltage conductor 101. For example, if the power flowing through the first phase high-voltage conductor 101 is one phase (e.g., A-phase) of AC power, then the power flowing through the second phase high-voltage conductor 102 can be another phase (e.g., B-phase, C-phase) of AC power. As another example, if the power flowing through the first phase high-voltage conductor 101 is a positive leg of DC power, then the power flowing through the second phase high-voltage conductor 102 can be a negative leg of DC power.

The arrester 120 can have a top end 121, an arrester body 122, and a bottom end 123. The arrester 120 (including one or more of its components) can be made of an electrically non-conductive material. For example, the arrester body 122 can be made of ceramic. The top end 121 of the arrester 120 is electrically and mechanically coupled to the first phase high-voltage conductor 101. The arrester 120 can have a length and/or thickness that meets or exceeds a minimum distance required for separating (thus preventing arc-over between) the high-voltage conductor to which the arrester 120 is coupled (e.g., the first phase high-voltage conductor 101) and the ground conductor 140. The length of the arrester 120 must be considered in light of a number of factors, including but not limited to the voltage flowing through the first phase high-voltage conductor 101, the distance between the first phase high-voltage conductor 101 and the second phase high-voltage conductor 102, the length of the ground conductor 140, and the distance between the bottom end 123 of the arrester 120 and the second phase high-voltage conductor 102.

The arrester body 122 can include one or more features (e.g., protrusions, as shown in FIG. 5 below) disposed on its outer surface to help ensure that the arrester 120 operates properly both during normal operating conditions and during fault conditions. Under normal operating conditions, as shown in FIG. 1, the arrester 120 acts as an insulator. In other words, under normal operating conditions, the arrester 120 prevents current from flowing from the top end 121 of the arrester 120 to the bottom end 123 of the arrester 120. Thus, the arrester 120 creates an open circuit between the first phase high-voltage conductor 101 and the ground conductor 140 during normal operating conditions.

In certain example embodiments, the arrester 120 can include one or more components. For example, the arrester 120 can include an isolator 130. In this case, the isolator 130 is disposed at the bottom end 123 of the arrester 120. The isolator 130 can include one or more components. For example, as shown in FIG. 1, the isolator 130 can include an isolator body 131 and a stud 132. Generally speaking, the isolator 130 acts as a type of mechanical switch. Specifically, the isolator 130 acts as a type of release mechanism that physically releases (directly or indirectly) the stud 132 disposed at the distal end of the isolator body 131 from the isolator body 131 when a certain condition is met (in this case, when a fault current is detected flowing through the arrester 120). The isolator 130 can be configured in one or more of a variety of forms. For example, the isolator 130 can be a relay with a coil (positioned within the isolator body 131) that energizes. In response to the energized coil, the isolator 130 can change the state of a contact (e.g., from open (normal state) to closed (operated state)).

As another example, the isolator 130 can be a disconnector. In such a case, the isolator 130 can include a detonator positioned within the isolator body 131 that detonates based on a range of currents for a given frequency. One or more discrete components (e.g., capacitors, inductors, resistors) and/or integrated circuits can be part of, or electrically coupled to, the isolator 130 to control the conditions under which the detonator of the disconnector (or any other aspect of isolator 130) detonates. If the isolator 130 is a disconnector, the isolator 130 can have an unprimed cartridge located in the vicinity of a sparkgap, which is oriented in parallel with some type of electrical grading component (e.g., an electronic capacitor, an electronic resistor, a conductive polymer, a high-wattage resistor). In such a case, during a fault condition, a voltage drop that occurs across the grading component can cause a heat buildup, thus igniting the cartridge. In certain example embodiments, the isolator 130 can break into multiple pieces when the disconnector (or other part of the isolator 130) detonates. The isolator 130 can be subject to one or more of a number of standards and/or regulations. Examples of such standards and/or regulations can include, but are not limited to, the Institute of Electrical and Electronics Engineers (IEEE) Standard C62.11-2012 and IEC 60099-4 (2009, ed. 2.2).

The ground conductor 140 is electrically and mechanically coupled to the isolator 130 (in this case, to the stud 132 of the isolator 130) at one end and to a piece 111 of the ground source 110 at the other end. The ground conductor 140 is made of one or more of a number of electrically conductive materials (e.g., copper, aluminum) and can be of an appropriate size (e.g., 6 AWG) to allow a fault current to flow therethrough during a fault condition. Specifically, a fault current flows from the stud 132, through the ground conductor 140, and to the ground source 110.

Similarly, the tether 142 is mechanically coupled to the isolator 130 (in this case, to the stud 132 of the isolator 130) at one end and to a piece 111 of the ground source 110 at the other end. In addition, the tether 142 can be mechanically coupled to the ground conductor 140 at one or more points along the length of the ground conductor 140. The tether 142 can be made of one or more of a number of electrically conductive materials (e.g., copper, aluminum). The tether 142 can be constructed in such a way as to be flexible. For example, as shown in FIG. 1, the tether 142 can be a chain having a number of links 143 that are coupled end-to-end in a line.

The tether 142 can be used for one or more of a number of purposes. For example, the tether 142 can help anchor the arrester 120, a relatively heavy component, against wind, vibrations, and other forces that can be applied to the arrester 120. Without the tether 142, only the ground conductor 140 would be used to anchor the bottom end 123 of the arrester 120.

FIG. 2 shows the portion of the transmission system 200 of FIG. 1 that includes the transmission line arrester 120 in a fault state according to embodiments currently known in the art. The components of FIG. 2 are identical to the components of FIG. 1, except that FIG. 2 shows a fault condition as opposed to the normal operating conditions shown in FIG. 1. When a fault condition occurs, a fault current is generated. In such a case, the arrester 120 conducts and allows the fault current to flow therethrough. Alternatively, FIG. 2 can show the portion of the transmission system 200 of FIG. 1 when the stud 132 experiences excessive mechanical stress, which causes the stud 132 (along with the ground conductor 140 and the tether 142) to separate from the rest of the arrester 120. Separation of the stud 132 from the remainder of the arrester 120 (and specifically from the isolator body 130 of the arrester 120) due to mechanical stress can occur during normal operating conditions or during a fault condition.

As described herein, a fault current (also called, among other commonly known names, a power surge, or simply a fault), is an electrical disturbance associated with a fault condition that falls outside of normal operating conditions and can lead to damage of electrical equipment if not contained and controlled. A fault current can be caused by one or more of a number of conditions, including but not limited to a lightning strike, a mechanical breakage, excessive heat, an open circuit, and putting power too close to ground.

When the isolator 130 detects a fault current flowing through the arrester 120, the isolator 130 changes from the normal state to an operated state. For the brief fractions of a second before the isolator 130 changes to the operated state, the fault current flowing through the arrester 120 continues through the stud 132 of the isolator 130, through the ground conductor 140, and to the piece 111 of the ground source 110. Once the isolator 130 is in the operated state, as shown in FIG. 2, the stud 132 of the isolator 130 physically separates from the isolator body 131. When this occurs, the isolator body 131 remains coupled to the bottom end 123 of the arrester 120, while the stud 132 remains mechanically and electrically coupled to the ground conductor 140 and the tether 142.

In some cases, when the stud 132 of the isolator 130 physically separates from the isolator body 131 during a fault condition, the stud 132, the ground conductor 140, and the tether 142 fall toward the second phase high-voltage conductor 102. When this occurs, and if the ground conductor 140 and/or the stud 132 make actual contact with the second phase high-voltage conductor 102, or if the ground conductor 140 and/or the stud 132 get close enough to the second phase high-voltage conductor 102 to cause an arc-over, additional problems may be caused because the second phase high-voltage conductor 102 would then become electrically directly coupled to ground. If the second phase high-voltage conductor 102 is still energized in such a case, an extended outage can result.

In addition, if there is no fault condition, but the stud 132 separates from the rest of the arrester 120 (as from, for example, high winds and/or excessive vibrations), an outage condition can occur because the arrester 320 is no longer electrically coupled to ground. In other words, by coupling the tether 142 and the ground conductor 140 to the stud 132, the stud 132 creates a failure point because of the mechanical stresses that the stud 132 can be subjected to during normal operations. If the stud 132 separates from the rest of the arrester 120 and if the tether 142 and the ground conductor 140 are mechanically coupled to the stud 132, as in the current art, unnecessary outages can result. Further, if the arrester 120 is not electrically coupled to ground (as when the stud 132, the tether 142, and the ground conductor 140 are separated from the rest of the arrester 120), then severe damage can result when a fault condition occurs because the arrester 120 cannot properly switch during the fault condition as designed.

In some cases, there is no second phase high-voltage conductor 302. Alternatively, the second phase high-voltage conductor 302 is located above, instead of below, the first phase high-voltage conductor 301. In either case, while there is no risk of the separated stud 132 (and attached ground conductor 140 and tether 142) shorting out the second phase high-voltage conductor 302, mechanical failure of the arrester 120 can still occur at any time. Again, this failure can occur because of the mechanical stresses applied to the stud 132 based on the coupling of the ground conductor 140 and the tether 142 to the stud 132.

FIG. 3 shows a portion of a transmission system 300 that includes a transmission line arrester 320 in a normally-operating state in accordance with certain example embodiments. FIG. 4 shows the portion of the transmission system 400 of FIG. 3 that includes the transmission line arrester 320 in a fault state (during a fault condition) in accordance with certain example embodiments. In one or more embodiments, one or more of the components shown in FIGS. 3 and 4 may be omitted, added, repeated, and/or substituted. Accordingly, embodiments of electrically insulated tethers for transmission line arresters should not be considered limited to the specific arrangements of components shown in FIGS. 3 and 4.

Referring now to FIGS. 1-4, the components (e.g., tether 142, arrester 120, isolator 130, first phase high-voltage conductor 101, ground conductor 140) of FIGS. 1 and 2 are substantially the same as the components (e.g., tether 342, arrester 320, isolator 330, first phase high-voltage conductor 301, ground conductor 340) of FIGS. 3 and 4, except as described below. The description for any component of FIGS. 3 and 4 not provided below can be considered substantially the same as the description for the corresponding component (e.g., housing portion 113, top member 181) described above with respect to FIGS. 1 and 2. The numbering scheme for the components of FIGS. 3 and 4 parallels the numbering scheme for the components of FIGS. 1 and 2 in that each component is a three digit number, where similar components have the identical last two digits.

In this case, the tether 342 of FIGS. 3 and 4 may be shorter than the tether 142 described above with respect to FIGS. 1 and 2. Specifically, the tether 342 has a length that is less than (rather than substantially the same as or longer than) the length of the ground conductor 340. Thus, while the tether 342 and the ground conductor 340 are both electrically and mechanically coupled to the piece 311 of the ground source 310, and while the ground conductor 340 is also electrically and mechanically coupled to the stud 332 of the isolator 330, the tether 342 may not be long enough to reach the arrester 320. The tether 342 can be made of one or more electrically conductive materials and/or one or more electrically non-conductive materials. The tether 342 can take on one or more of a number of forms. For example, in this case, the tether 342 is a chain with a number of links 343 that are interlocked end-to-end. In such a case, the ground conductor 340 can be surrounded by one of more of the links 343 in the tether 342.

Instead, in certain example embodiments, another tether 350 is used to mechanically couple the arrester 320 to the tether 342. Specifically, the example tether 350 is mechanically coupled to the tether 342 at one end and to the bottom end 323 of the arrester 320, between the arrester body 322 and the isolator 330, at the other end. Details of the example tether 350 are provided below with respect to FIGS. 5-6B. Depending on one or more of a number of factors (e.g., the length of the tether 350 relative to the length of the tether 342 and the ground conductor 340, the configuration of the tether 350, the length of the isolator 330), the position of the tether 350 and the tether 342 may or may not change much between the normally-operating state and a fault state (during a fault condition). Based on the configuration in FIGS. 3 and 4, the position of the tether 350 and the tether 342 does not change much between the normally-operating state and during a fault condition. In other words, the tether 350 and the tether 342 remain mechanically coupled to each other, to the arrester 320, and the ground source 310, regardless of whether the stud 332 has physically separated from the remainder of the arrester 320.

The tether 342 and the tether 350 can be considered a single tether. Further, there can be only one tether segment or more than two tether segments (e.g., tether 342, tether 350) that make up a tether in certain example embodiments. Regardless of how many tether segments make up an example tether, at least some portion of the example tether is electrically non-conductive. The electrically non-conductive portion(s) of the example tether can be located at any point along the example tether. For example, as described above, the electrically non-conductive portion of the example tether can be located proximate to the arrester 320. As another example, the electrically non-conductive portion of the example tether can be coupled to, or located proximate to, the ground source 310.

In certain example embodiments, one end of the tether 350 is coupled to one end of the tether 342, and the tether 342 is coupled to the ground conductor 340 at one or more points along the length of the tether 342. As shown in FIGS. 3 and 4, the tether 350 is coupled to the tether 342 at approximately the same point as the tether 342 is coupled to the ground conductor 340. Alternatively, the tether 342 can be coupled to the ground conductor 340 at a different point of the tether relative to where the tether 350 is coupled to the tether 342.

As shown in FIG. 4, when a fault condition occurs, causing the stud 332 of the isolator 330 to be physically separated from the isolator body 331, the example tether 350 allows the stud 332 to have sufficient separation from the arrester 320 while also preventing the stud 332 and the ground conductor 340 from making contact (or getting too close to cause an arc-over) with the second phase high-voltage conductor 302. Thus, example embodiments allow the arrester to operate properly in clearing a fault condition while also preventing additional damage to another high-voltage conductor 302 (e.g., the second phase high-voltage conductor 302).

Figure 6A:
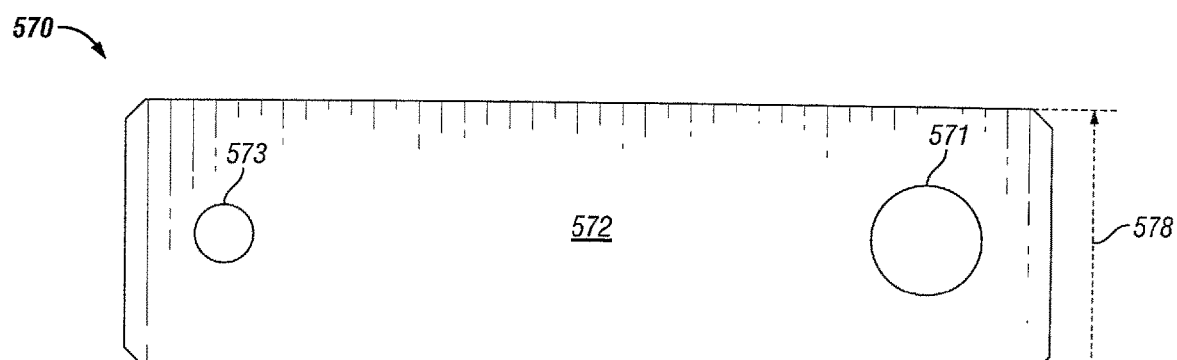
FIGS. 6A and 6B show various views of the bracket of the additional tether of FIG. 3 in accordance with certain example embodiments.
Figure 6B:
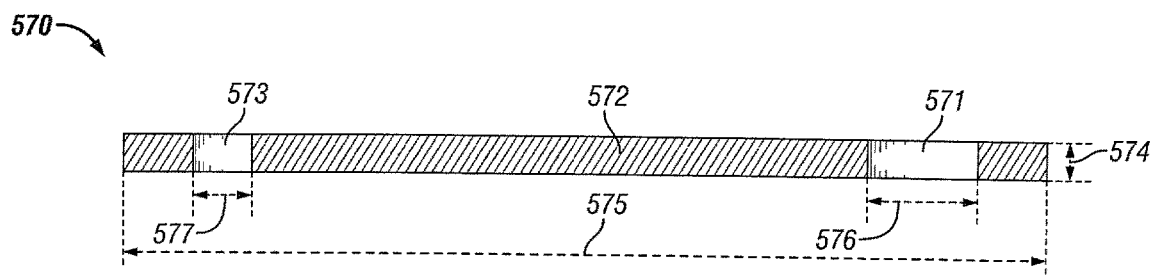

As stated above, FIGS. 5-6B show various views of a portion of the transmission system of FIG. 3, with a focus on the example tether. Specifically, FIG. 5 shows a portion of the transmission system 500 of FIG. 3 that includes a detailed view of the additional tether 350 coupled to the arrester 320 in accordance with certain example embodiments. FIGS. 6A and 6B show a top and cross-sectional side view, respectfully, of a coupling portion 570 of the example tether 350 in accordance with certain example embodiments. In one or more embodiments, one or more of the components shown in FIGS. 5-6B may be omitted, added, repeated, and/or substituted. Accordingly, embodiments of electrically insulated tethers for transmission line arresters should not be considered limited to the specific arrangements of components shown in FIGS. 5-6B.

Referring to FIGS. 1-6B, the example tether 350 can have one or more portions. For example, as shown in FIG. 5, the tether 350 can have a coupling portion 570 and an insulating portion 580. The insulating portion 580 can have a body 582 that is made of one or more of a number of electrically non-conductive materials (e.g., ceramic, glass) having one or more of a number of shapes. For example, the body 582 of the insulating portion 580 can be a glass rod. As another example, the body 582 of the insulating portion 580 can be one or more of a number of insulating bushings. In such a case, the insulating bushings can be specially designed for this tethering purpose or can be off-the-shelf bushings (e.g., bushings that are used in electric distribution (e.g., relatively lower voltage) systems). When multiple bushings are used, they can be coupled in any suitable manner (e.g., end-to-end).

When there are multiple portions of the tether 350, such portions can be mechanically coupled to each other, directly or indirectly, in one or more of a number of suitable ways using one or more of a number of coupling features. In this example, coupling feature 590, when used in conjunction with coupling feature 573 of the coupling portion 570 of the tether 350 and with coupling feature 581 of the insulating portion 580 of the tether 350, is used to couple the coupling portion 570 of the tether 350 to insulating portion 580 of the tether 350. Examples of a coupling feature 590 can include, but are not limited to, welding, epoxy, fastening devices (e.g., a nut, a bolt, a rivet, a split pin 593 as shown in FIG. 5), compression fittings, slots, tabs, and detents.

The coupling feature 590 in this case includes a stem 592 that traverses one or more coupling features 581 (in this case, apertures) in one or more distal portions 583 of the insulating portion 580, as well as one or more coupling features 573 (in this case, an aperture) in the body 572 of the coupling portion 570. The coupling feature 590 can also include a head 591 disposed at one end of the stem 592, where the head abuts against the distal end 583 of the insulating portion 580 (as in this example) or against the coupling portion 570. As discussed above, the coupling feature 590 can also include a split pin 593 that traverses an aperture in the end of the stem 592 opposite from the head 591.

In certain example embodiments, the aperture in the distal end 583 of the insulating portion 580 and the aperture 573 in the coupling portion 570 can have substantially the same (or slightly larger) shape and size compared to the shape and size of the stem 592. For example, the aperture 573 and the apertures 581 can be substantially circular with a diameter 577. (If the aperture 573 and/or the apertures 581 are not circular, then the term diameter 577 can be used to describe a width, a length, or some other measure of the outer perimeter of the shape of the aperture.) The coupling portion 570 can have a thickness 574, a length 575, and a width 578 sufficient to help secure the arrester 320 by maintaining a mechanical coupling between the bottom end 323 of the arrester 320 and the overall tether (in this case, tether 350 and the tether 342) while also avoiding a direct or indirect (e.g., arc-over) ground fault, both during normal operating conditions and during a fault condition.

In certain example embodiments, the coupling portion 570 also mechanically couples to the arrester 320 in one or more of a number of ways and at one or more of a number of locations along the arrester 320. In such a case, the coupling portion 570 can include one or more coupling features. For example, in this case, the coupling portion 570 includes coupling feature 571, which couples to the arrester 320 at the bottom end 323 between the arrester body 322 and the isolator 330. The coupling feature 571 in this case is an aperture that traverses the body 572 of the coupling portion 570. The coupling feature 571 can have a shape and size (e.g., a circular shape with a diameter 576) that is substantially the same as, or slightly larger than, the shape and size of the bottom end 323 of the arrester 320. In such a case, the coupling portion 570 is disposed over a portion of the bottom end 323 of the arrester 320. Further, the coupling portion 570 abuts against the arrester body 322 and is held in place, directly or indirectly, by a coupling feature 560 (e.g., a fastening device such as a nut, as shown in FIG. 5).

As discussed above, the tether 350 can be configured to provide substantial stability to the bottom portion of the arrester 320. Thus, the tether 350 and its various portions (e.g., coupling portion 570, insulating portion 580) can be configured to withstand substantial forces brought on by, for example, wind, vibrations, heat, gravity. Further, by moving the coupling point of the tether 350 away from the stud 332 of the isolator 330, the isolator 330 and its various components experience significantly less mechanical stress, leading to an extended useful life.

As mentioned above, the arrester body 322 can have one or more of a number of features to enhance its properties during normal operating conditions and/or during a fault condition. For example, as shown in FIG. 5, the arrester body 322 can have one or more of a number of protruding sections 524. Similarly, the insulating portion 580 of the tether 350 can have one or more of a number of protruding sections 584.

Example embodiments can have different components and/or configurations than what is shown and/or described herein. For example, certain example embodiments can have more than two tethers that are coupled to each other between the arrester 320 and the ground source 310. As another example, the example tether can be coupled to a different portion (e.g., the arrester body 322, the isolator body 331) of the arrester 320. As yet another example, one or more example tethers can couple to multiple portions of the arrester 320. As with FIGS. 1 and 2, in certain example embodiments, there is no second phase high-voltage conductor 302. Alternatively, the second phase high-voltage conductor 302 is located above, instead of below, the first phase high-voltage conductor 301.

Example embodiments provide increased mechanical stability of the arrester, extending the useful life and reliability of the arrester. Example embodiments provide a number of benefits. Examples of such benefits include, but are not limited to, reduced downtime of equipment, lower maintenance costs, avoidance of catastrophic failure, improved maintenance planning, improved efficiency of one or more devices and/or other portions of an example transmission system, extended useful life of one or more components of an example transmission system, and reduced cost of labor and materials.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An electrical transmission system, comprising:
   at least one first phase high-voltage conductor;
   an arrester coupled to the at least one first phase high-voltage conductor, wherein the arrester comprises an arrester body and an isolator, wherein the arrester body comprises a top end and a bottom end, wherein the top end of the arrester is coupled to the at least one first phase high-voltage conductor, and wherein the bottom end of the arrester body is coupled to a top portion of the isolator;
   a ground conductor coupled to a bottom portion of the isolator of the arrester;
   a first tether coupled to the ground conductor, wherein the first tether comprises a first distal end and a first proximal end, wherein the first proximal end of the first tether is coupled to a ground source; and
   a second tether comprising a second distal end and a second proximal end, wherein the second proximal end of the second tether is coupled to the first tether, wherein the second distal end of the second tether is coupled to the arrester above the isolator,
   wherein at least a portion of the second tether is electrically non-conductive, and
   wherein the second tether supports the first tether, the ground conductor, and the bottom portion of the isolator after a fault occurs.

2. The electrical transmission system of claim 1, wherein the second proximal end of the second tether is coupled to the first distal end of the first tether.

3. The electrical transmission system of claim 1, wherein the ground conductor has a first length, wherein the first tether has a second length, and wherein the second length is less than the first length.

4. The electrical transmission system of claim 3, further comprising:
   at least one second phase high-voltage conductor disposed a first distance from the at least one first phase high-voltage conductor.

5. The electrical transmission system of claim 4, wherein a difference between the first length and the second length is less than a second distance between the arrester and the at least one second phase high-voltage conductor.

6. The electrical transmission system of claim 3, wherein the second tether has at least a third length, wherein the third length is less than the first length.

7. The electrical transmission system of claim 1, wherein the second tether comprises a coupling portion and an insulating portion, wherein the coupling portion and the insulating portion are mechanically coupled to each other, and wherein the insulating portion is electrically non-conductive.

8. The electrical transmission system of claim 7, wherein the insulating portion of the second tether comprises at least one insulator.

9. The electrical transmission system of claim 8, wherein the at least one insulator is designed for use in an electric distribution system.

10. The electrical transmission system of claim 7, wherein the coupling portion of the second tether is electrically conductive.

11. The electrical transmission system of claim 1, wherein the second proximal end of the second tether is coupled to the arrester between the arrester body and the isolator.

12. The electrical transmission system of claim 1, wherein at least a portion of the first tether is electrically non-conductive.

13. The electrical transmission system of claim 1, wherein the isolator comprises an isolator body and a stud disposed on a bottom portion of the isolator body, wherein the ground conductor is mechanically coupled to the stud.

14. The electrical transmission system of claim 13, wherein the second tether remains coupled to the arrester when the stud is separated from the isolator body.

15. The electrical transmission system of claim 1, further comprising:
   a ground source coupled to the ground conductor, wherein the first proximal end of the first tether is further coupled to the ground source.

16. A tether for a ground source coupled to an arrester, the tether comprising:
   a coupling portion comprising a first coupling feature and a second coupling feature, wherein the first coupling feature is configured to couple to the arrester between an arrester body and an isolator of the arrester; and
   an insulating portion comprising a first end and a second end, wherein the first end is coupled to the second coupling feature of the coupling portion, wherein the second end is coupled to an additional tether, wherein the additional tether is coupled to the ground source, wherein at least a portion of the insulating portion is electrically non-conductive, wherein the coupling portion is configured to remain coupled to the insulating portion and the arrester after a fault occurs, and wherein the insulating portion remains coupled to and supports the additional tether and the ground source, and a bottom portion of the isolator of the arrester after a fault occurs.

17. The tether of claim 16, wherein the ground source comprises a ground conductor, wherein the second end of the insulating portion is coupled to a middle portion of the ground conductor, and wherein the distal end of the ground conductor is coupled to a stud detachably coupled to a distal end of the isolator of the arrester.

18. The tether of claim 16, wherein the additional tether is coupled to a portion of the ground source.

19. The tether of claim 16, wherein the first coupling feature of the coupling portion comprises an aperture, wherein the aperture has a bottom end of the arrester disposed therein.

20. The tether of claim 16, wherein the second coupling feature of the coupling portion comprises an aperture, wherein the aperture has a fastening device disposed therein, wherein the fastening device is further disposed in an additional aperture of first end of the insulating portion.

* * * * *